(12) United States Patent
Rouhiainen et al.

(10) Patent No.: US 8,330,465 B2
(45) Date of Patent: Dec. 11, 2012

(54) MEASURING HEAD AND MEASURING METHOD

(75) Inventors: Pekka Rouhiainen, Espoo (FI); Aimo Hautojärvi, Rauma (FI); Turo Ahokas, Helsinki (FI)

(73) Assignee: Posiva Oy, Olkiluoto (FI)

( * ) Notice: Subject to any disclaimer, the term of this patent is extended or adjusted under 35 U.S.C. 154(b) by 399 days.

(21) Appl. No.: 12/440,771

(22) PCT Filed: May 8, 2007

(86) PCT No.: PCT/FI2007/000122
§ 371 (c)(1),
(2), (4) Date: Jul. 28, 2009

(87) PCT Pub. No.: WO2008/031914
PCT Pub. Date: Mar. 20, 2008

(65) Prior Publication Data
US 2010/0013488 A1    Jan. 21, 2010

(30) Foreign Application Priority Data
Sep. 12, 2006 (FI) .................................. 20060812

(51) Int. Cl.
*G01V 3/00* (2006.01)
(52) U.S. Cl. ........................ 324/355; 324/333; 324/338
(58) Field of Classification Search .................. 324/221, 324/333–343, 346, 351–353, 355–356; 73/152.28–152.29, 152.46, 152.54–152.57
See application file for complete search history.

(56) References Cited

U.S. PATENT DOCUMENTS

| | | | |
|---|---|---|---|
| 2,712,629 A | 7/1955 | Doll | |
| 3,521,154 A | 7/1970 | Maricelli | |
| 4,786,874 A * | 11/1988 | Grosso et al. | 340/853.4 |
| 4,803,874 A | 2/1989 | Marrast et al. | |
| 5,103,178 A * | 4/1992 | Desbrandes | 324/351 |
| 5,200,705 A * | 4/1993 | Clark et al. | 324/338 |
| 5,804,714 A | 9/1998 | Rouhiainen | |
| 5,831,156 A | 11/1998 | Mullins | |
| 5,892,460 A * | 4/1999 | Jerabek et al. | 340/856.4 |
| 6,025,722 A * | 2/2000 | Evans et al. | 324/373 |
| 6,359,438 B1 * | 3/2002 | Bittar | 324/369 |

(Continued)

FOREIGN PATENT DOCUMENTS

JP         5-346017 A    12/1993

(Continued)

OTHER PUBLICATIONS

Japanese Office Action for corresponding Japanese Patent Application No. 2009-527164 mailed Aug. 9, 2012.

*Primary Examiner* — Joshua Benitez Rosario
(74) *Attorney, Agent, or Firm* — Merchant & Gould P.C.

(57) ABSTRACT

A measuring head for use in electrical measurements conducted in holes drilled in the ground comprises an elongated body, adaptable in the hole and comprising an electrode, electrically connecting the measuring head with its surroundings, for transmitting an electrical signal between the measuring head and its surroundings. In accordance with the invention, the measuring head comprises insulating means, placed on the body on both sides of the electrode along the length of the hole in order to form a measuring area, electrically insulated from other parts of the hole, around the electrode placed in the hole.

5 Claims, 3 Drawing Sheets

U.S. PATENT DOCUMENTS

Figure 1:
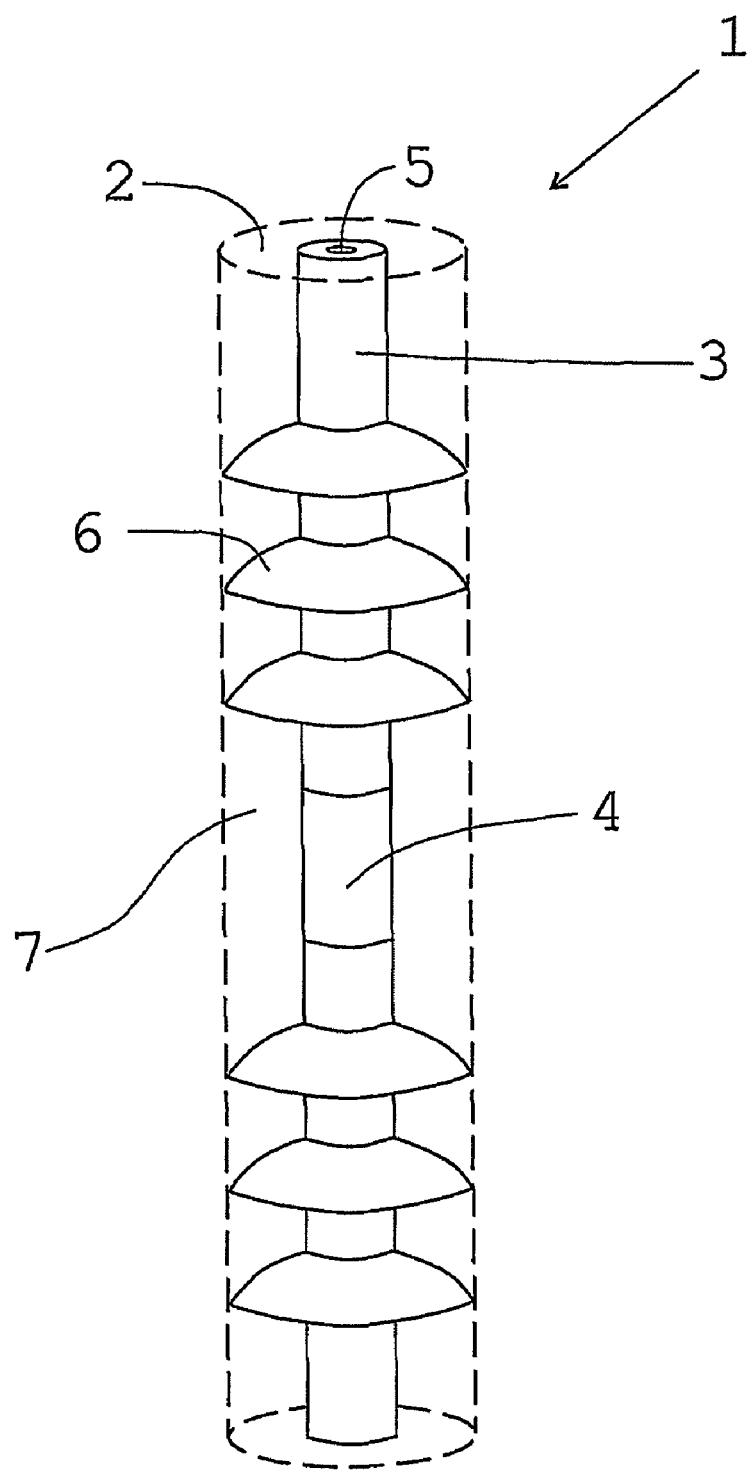

| | | | |
|---|---|---|---|
| 7,109,719 B2 * | 9/2006 | Fabris et al. | 324/367 |
| 8,130,117 B2 * | 3/2012 | Hall et al. | 340/853.1 |
| 8,141,436 B2 * | 3/2012 | Pollanen et al. | 73/861.73 |
| 8,174,265 B2 * | 5/2012 | Bittar et al. | 324/338 |
| 2006/0150727 A1 * | 7/2006 | Estes | 73/152.56 |
| 2011/0197667 A1 * | 8/2011 | Pollanen et al. | 73/152.29 |

FOREIGN PATENT DOCUMENTS

| | | |
|---|---|---|
| JP | 9-222377 A | 8/1997 |
| JP | 9-257950 A | 10/1997 |
| JP | 10-268061 A | 10/1998 |

* cited by examiner

MEASURING HEAD AND MEASURING METHOD

FIELD OF THE INVENTION

This application is a National Stage Application of PCT/FI2007/000122, filed 8 May 2007, which claims benefit of Ser. No. 20060812, filed 12 Sep. 2006 in Finland and which applications are incorporated herein by reference. To the extent appropriate, a claim of priority is made to each of the above disclosed applications.

The invention relates to various electrical measurements conducted in holes drilled in the ground, and in particular in a rocky soil, for investigating the soil quality. The invention focuses specifically on the measuring head used in the measurements, and on the actual measuring method.

BACKGROUND OF THE INVENTION

Electrical measurements conducted through holes drilled in the ground play an important part when investigating soil quality. When considering for example disposal sites for nuclear waste, it is important to determine the rock structure, and in particular the amount and quality of clefts found therein. Another interesting application for these kinds of measurements is ore prospecting.

Known in prior art are various electrical measuring methods for investigating the soil. For instance, the so called single point resistance (SPR) is based on measuring the resistance between an electrode placed in a hole drilled in the ground and the surroundings of the hole. In case of rock, for instance, the resistance by a solid rock is high, but typically decreases significantly by rock fractures or clefts filled with water. The resistance can thus be used when investigating the positions of clefts or the like.

Another known method is mise á la masse. It involves feeding electric current into an electrode, which is placed in a hole drilled in the ground, and measuring the voltage from other holes drilled in the ground at a distance from the first hole. When the current electrode is placed in a conductive area, for example by a wet rock cleft or ore deposit, a nearly constant potential is formed in said area. The higher the resistance of the area outside the conductive area, the faster is the decrease in the potential outside the conductive area. Examining the voltage in and outside the conductive area allows thus the determination of geometry, and also, to some extent, of conductivity of the conductive area.

The methods described above have one significant problem. In order to ensure accurate measuring, the electrical measuring area should be limited near the electrode. For example in SPR, if the entire hole is filled with water, and is therefore conductive, the resistance for instance by a rock cleft does not necessarily differ much from the resistance between the electrode and the walls of the hole in other parts of the hole. In mise á la masse, for example when investigating the extent and shape of rock clefts, the current fed through an electrode may migrate both upwards and downwards in the conductive hole, and further to other clefts than the ones the investigation is focused on. In this case, when a conductive area, i.e. a cleft, is detected by measuring the voltage, it is not certain that the cleft in question is the one into which the current is fed. The resolution of these methods is therefore inadequate.

OBJECTIVE OF THE INVENTION

The objective of the invention is to alleviate the problem referred to above and thereby improve the accuracy of electrical measurements conducted in holes drilled in the ground.

SUMMARY OF THE INVENTION

The measuring head and the measuring method of the invention are characterized by what has been presented in claims 1 and 6, respectively.

The measuring head of the invention for use in electrical measurements conducted in holes drilled in the ground comprises an elongated body, adjustable to the hole, which body comprises an electrode, electrically connecting the measuring head with its surroundings, for transmitting an electrical signal between the measuring head and its surroundings. Preferably, the body has a significantly smaller profile than the hole used for measuring, so that it can be easily placed in the hole. The outer surface of the body is typically made, except for the electrode area, from plastic or other insulating material, such that the metal-coated electrode is the only part of the measuring head having electrical contact with the surroundings of the measuring head. The signal transmission in this context may be directed from the electrode to the surroundings, such as when supplying the current signal in mise á la masse, but the same measuring head construction is as well equally suitable for receiving the voltage signal of the mise á la masse method.

In accordance with the invention, the measuring head comprises insulating means, placed on the body on both sides of the electrode along the length of the hole to form a measuring area, electrically insulated from other parts of the hole, around the electrode placed in the hole. Delimiting the measuring area in this way provides significant improvement to the measuring resolution, because the area into which the signal is fed or, respectively, in which the signal is received is limited near the electrode. For example in mise á la masse, this ensures that current is fed only into the desired rock cleft or other conductive area, and, respectively, by voltage measurements of limited coverage area, the conductive area determined in this way is known to be in contact with the exact and same area.

The insulating means are preferably flexible and elastic, plate-like insulating sheets, arranged around the body and having a free diameter which is at least equal to that of the hole. They can be made for example from plastic or rubber. The free diameter of the flexible insulating sheet herein means the diameter in the transverse direction of the body when the measuring head is not placed in the hole. A flexible insulating sheet having a diameter larger than that of the hole is, when the measuring head is placed in the hole, pressed tightly against the walls of the hole, at the same time efficiently breaking the electrical connection lengthwise in the hole. Even if the sheets are not pressed completely tightly against the wall, the electrical conductivity past the insulating sheet will in any case decrease significantly. Such insulating sheets are very simple, and therefore costeffective, means for realizing electrical insulation.

In one preferred embodiment of the invention, the insulating sheets curve in one direction along the length of the body, such that they follow the movements of the measuring head in the hole in one direction, and, when the measuring head moves in the opposite direction, become tighter pressed against the walls of the hole. The curving may be directed, for example, toward the upper end of the measuring head, which facilitates the placement of the measuring head into the hole, and the measuring area can be tightly insulated by lifting the measuring head slightly upwards at the desired depth.

To further increase the efficiency of insulation, one preferred embodiment of the invention comprises, on both sides of the electrode, at least two successive insulating sheets along the length of the body. In this way, a possibly insufficient insulation capacity of one insulating sheet does not compromise efficient electrical insulation.

Since the desired areal measuring resolution varies according to application and soil quality, the insulating means are preferably arranged to move along the length of the body for adjusting the length of the measuring area, arranged around the electrode and electrically insulated from other parts of the hole.

In the measuring method of the invention for use in electrical measurements conducted in holes drilled in the ground, an electrical signal is transmitted between the electrode placed in the hole and its surroundings. In accordance with the invention, the method involves electrically insulating, along the length of the hole, the surroundings of the electrode from other parts of the hole. This allows the limitation of the coverage area for the measuring head signal supply or reception, which significantly improves the measuring resolution. Insulating means such as those described above are preferably used for the electrical insulation.

DETAILED DESCRIPTION OF THE INVENTION

Figure 2:
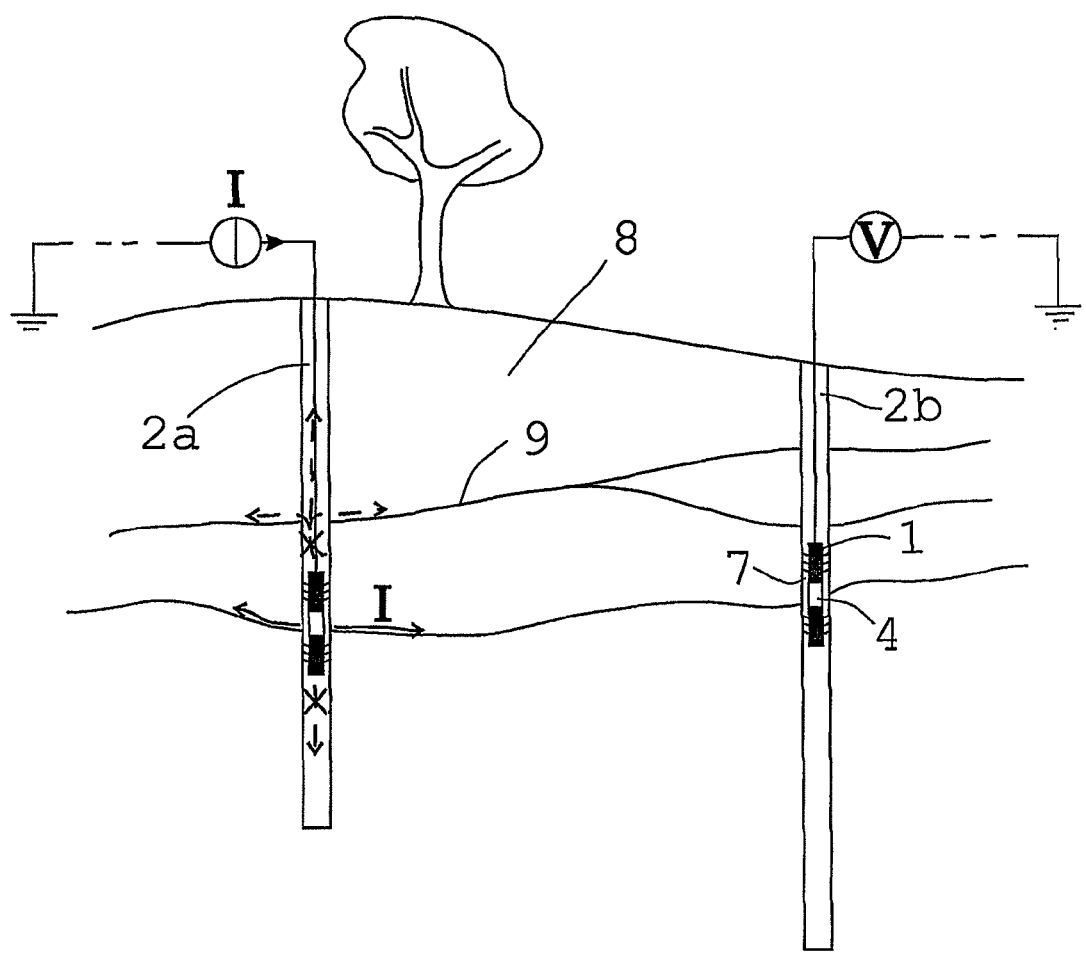
Figure 3:
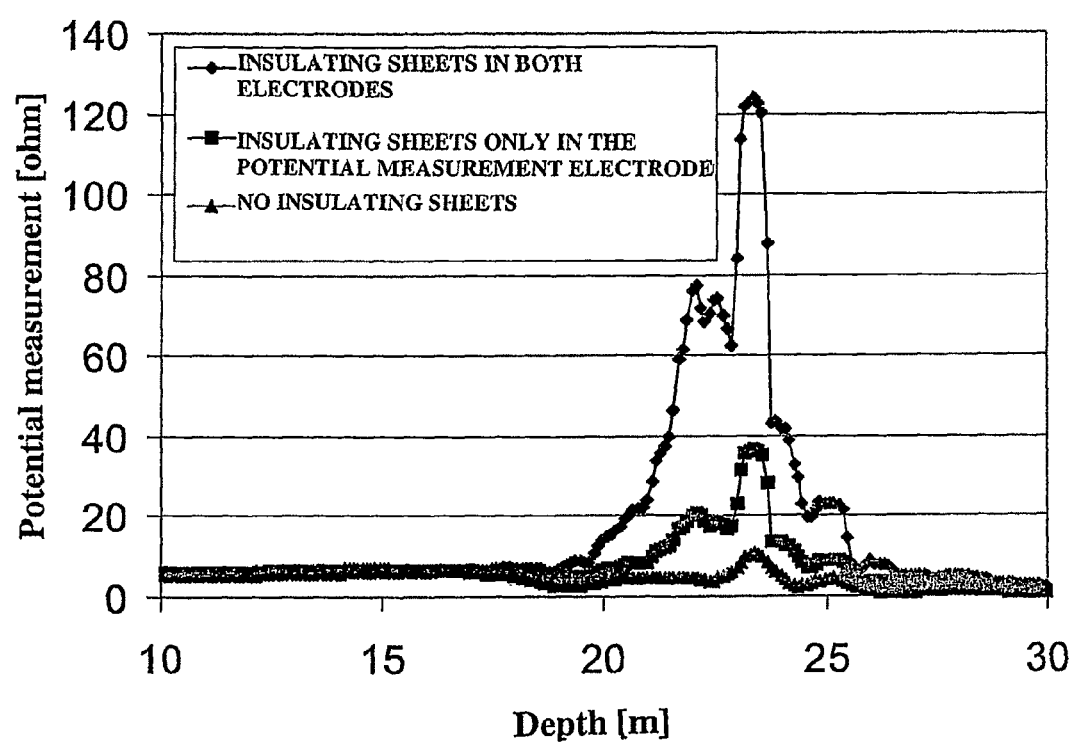

In the following, the invention will be described with reference to the accompanying drawings, in which FIG. 1 represents one embodiment of the measuring head in accordance with the invention, FIG. 2 represents the principle of mise á la masse when the measuring head in accordance with the invention is used, and FIG. 3 represents an example of the measurement results from a measuring arrangement such as the one represented in FIG. 2.

FIG. 1 represents a section of a measuring head 1 and a drill hole 2 into which the measuring head is placed. The measuring head comprises an elongated body 3, coated in an insulating material, the mid-portion of which body comprises a metallic electrode 4, electroconductively connected via a cable 5 attached to the measuring head and laid inside the body with other measuring equipment (not shown in the figure) on the ground surface. The electrical signal can be transmitted via the electrode between the measuring head and its surroundings.

Three flexible and elastic, thin and plate-like plastic sheets 6 are successively attached to the body of the measuring head on both sides of the electrode. The size of the sheets is so adapted that the diameter of each sheet, when in free position, is slightly larger than that of the drill hole. When the measuring head is placed into the drill hole, the edges of the flexible sheets become thus pressed against the walls of the hole.

The plastic sheets function as electrical insulators, forming around the electrode, along the length of the hole, a measuring area 7, electrically insulated from other parts of the drill hole. The insulated measuring area delimits thus the area in which an electrical signal may be transmitted between the electrode and its surroundings. This means that both when feeding the signal via the electrode and when using it as a receiving signal detector, the areal resolution of the electrode improves substantially when compared to the solutions of the prior art, which do not form an electrically insulated measuring area. This improvement in resolution is illustrated in FIG. 2. Both sides of the electrode comprise three insulating sheets, because one insulating sheet is not necessarily capable of insulating the measuring area efficiently enough in all circumstances.

The sheets 6 curve mutually in the same direction along the length of the body of the measuring head. This facilitates the movement of the measuring head in one direction in the drill hole, and the pressure of the sheets against the wall of the hole as the measuring head is moved in the other direction in the hole. In the case of FIG. 1, curving is directed toward the lower end of the measuring head. However, the direction may as well be the opposite, as in FIG. 2. The curving direction depends for example on whether the measurements are intended to be conducted first at the lower end of the hole and thereafter by lifting the measuring head stepwise in the hole, or the other way round.

FIG. 2 illustrates the efficiency of the invention in mise á la masse. Two drill holes 2a, 2b are drilled in rocky soil 8. The soil comprises clefts 9 which are typically filled with water and therefore conduct electricity. The principle of mise á la masse is to feed electric current I into the conductive underground area via the drill hole, and to measure the voltage from the other holes. An area which has good conductivity is substantially detected in voltage measurements as an area of constant potential, outside which the potential changes all the more radically as the electrical conductivity in the surroundings of the area decreases. This allows the determination of size and shape of the conductive areas, such as rock clefts or ore deposits, and further of their conductivity. In the situation presented in FIG. 2, when feeding electric current into the drill hole 2a, possibly filled with water, by means of a traditional measuring head, the electric current may flow both up- and downwards in the hole filled with water in accordance with the arrows indicated in dashed line in the figure, and further into all clefts 9, within the ratios defined by their conductivities. In this case, when prospecting for conductive areas by means of measuring the voltage from the other holes 2b, such areas would be detected by every cleft, and it would not necessarily be possible to determine, even by the intensity of the voltage, which of the areas would be in direct contact with the cleft nearest to the electrode feeding the current. As indicated by the figure, when using the measuring heads 1 in accordance with the invention by forming around the electrode 4 a measuring area 7, electrically insulated from other parts of the drill hole, the coverage areas of both current supply and voltage measurement can be delimited in such a way that the measuring resolution improves substantially. In other words, the current, for example, cannot flow out of the measuring area 7 in the drill hole 2a. This enables the detection from the potential measurement hole, by means of measuring the voltage, of the exact cleft which is positioned by the measuring area of the electrode feeding the current. A similar improvement in resolution when compared to the measuring heads in accordance with the prior art is also detected for example in SPR conducted by one electrode.

The measurement results of FIG. 3 were obtained in an arrangement in which a current electrode was placed in one hole by a rock cleft, formed at the depth of 23.6 m, and the potential measurement electrode was being moved in the other hole. The figure shows the results of the potential measurement electrode at the electrode depths of 10-30 m. Measurements were conducted using arrangements in which the insulating rubber sheets in accordance with the invention were not used, in which the insulating sheets were used only around the potential measurement electrode, and in which the insulating sheets were installed in both measuring heads. The insulating sheets were used as stacks of four successive sheets. The results are presented as resistance values, achieved by converting the voltage into resistance by means of the current fed, using the ratio U=RI (U=voltage, I=current, and R=resistance). In an area which has good conductivity and into which current is fed, the voltage is practically constant, its intensity following the intensity of the resistance between the conductive area and the electrical ground plane. Outside the conductive area, the voltage and, similarly, the resistance between the measuring point and the electrical ground plane decreases. This phenomenon is indicated in the results of FIG. 3 as an increase in the signal of voltage, and of resistance calculated from the voltage, by the gap into which the current is fed.

As indicated by the results, using insulating sheets merely in conjunction with the potential measurement electrodes more than triples the signal by the gap compared to the situation without the insulating sheets. When the insulating sheets are installed in both measuring heads, the detected signal becomes more than tenfold stronger compared to the signal without the insulating sheets. These results clearly demonstrate the efficiency that can be reached in the resolution of electrical measurements by electrically insulating the surroundings of the electrode from other parts of the drill hole in accordance with the invention.

The invention is not limited to the examples referred to above; instead many variations of its embodiments are possible within the scope of the claims.

The invention claimed is:

1. A measuring head for use in electrical measurements conducted in holes drilled in the ground, the measuring head comprising an elongated body, adaptable into a hole, for being placed apart from a wall of the hole, the elongated body comprises an electrode, for electrically connecting the measuring head with surroundings of the electrode, for transmitting an electrical signal between the measuring head and the surroundings, wherein the measuring head comprises insulating means placed on the elongated body on both sides of the electrode along a length of the elongated body in order to form a measuring area, electrically insulated from other parts of the hole, around the electrode placed in the hole, wherein the insulating means are flexible and elastic, plate-like insulating sheets arranged around the elongated body and having a free diameter which is at least equal to that of the hole.

2. The measuring head in accordance with claim 1, wherein the insulating sheets curve in one direction along the length of the elongated body, such that they follow the movement of the measuring head in the hole in one direction, and become tighter pressed against the walls of the hole as a result of the movement of the measuring head in the opposite direction.

3. The measuring head in accordance with claim 1, wherein to increase the efficiency of insulation of the measuring area, at least two insulating sheets are placed successively on both sides of the electrode along the length of the elongated body.

4. The measuring head in accordance with claim 1, wherein the insulating means are arranged to move along the length of the body for adjusting the length of the measuring area, arranged around the electrode and electrically insulated from other parts of the hole.

5. A measuring method for use in electrical measurements conducted in holes drilled in the ground, the method comprising transmitting an electrical signal between an electrode in an elongated body placed in a hole from a wall of the hole and surroundings of the electrode, providing insulating means on the elongated body on both sides of the electrode along a length of the elongated body in order to form a measuring area electronically insulated from other parts of the hole around the electrode placed in the hole, wherein the insulating means are flexible and elastic, plate-like insulating sheets arranged around the elongated body and having a free diameter which is at least equal to that of the hole.

* * * * *